Jan. 17, 1933.   E. W. MITCHEL   1,894,595
ROLLER BEARING CAGE AND METHOD OF FORMING THE SAME
Filed Aug. 5, 1929   2 Sheets-Sheet 1
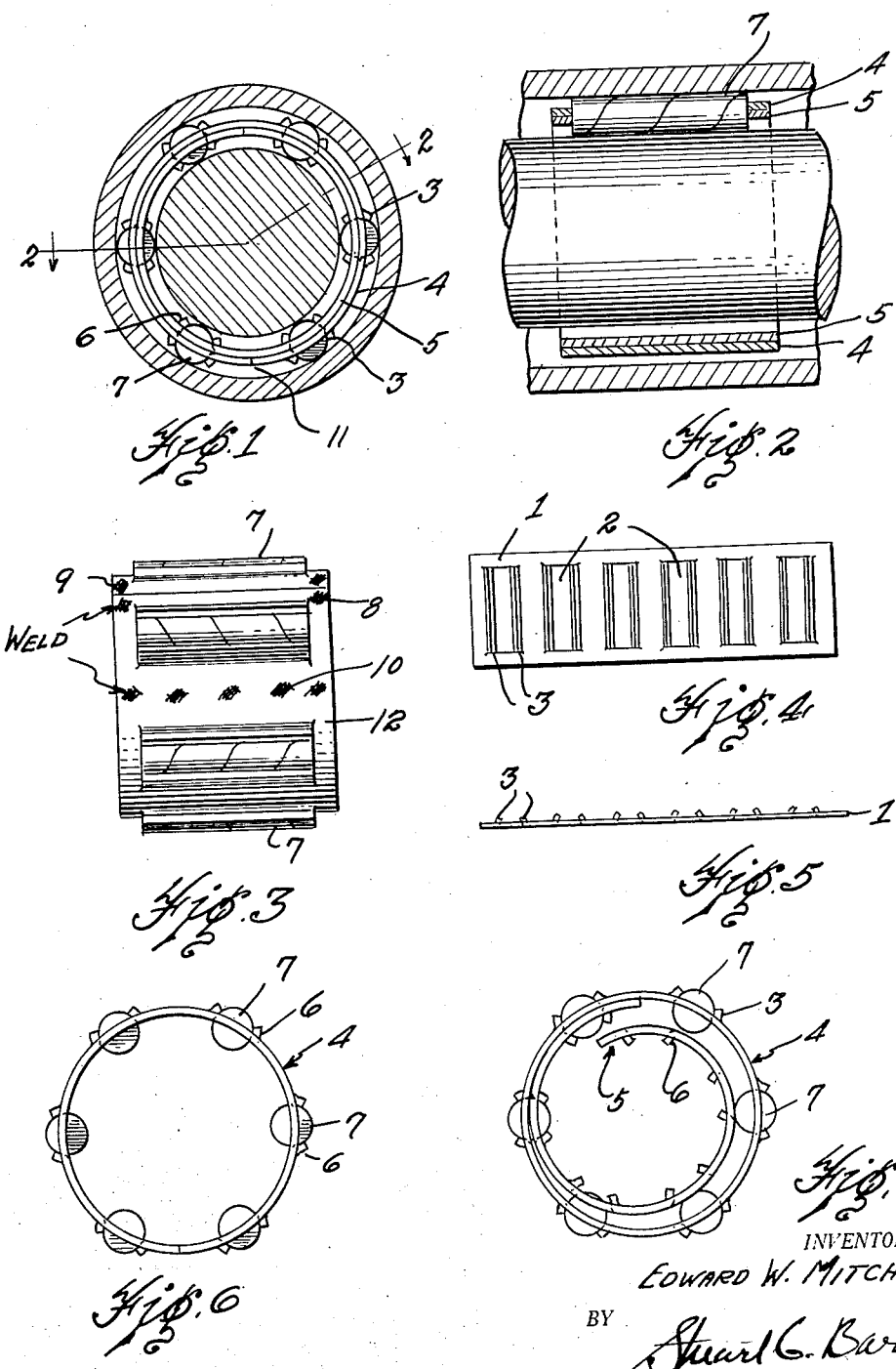
INVENTOR.
EDWARD W. MITCHEL
BY
Stuart G. Barnes
ATTORNEY.

Jan. 17, 1933.  E. W. MITCHEL  1,894,595
ROLLER BEARING CAGE AND METHOD OF FORMING THE SAME
Filed Aug. 5, 1929   2 Sheets-Sheet 2

INVENTOR.
EDWARD W. MITCHEL
BY
ATTORNEY.

Patented Jan. 17, 1933

1,894,595

UNITED STATES PATENT OFFICE

EDWARD W. MITCHEL, OF DETROIT, MICHIGAN, ASSIGNOR TO F. L. McLAUGHLIN CORPORATION, OF DETROIT, MICHIGAN, A CORPORATION OF MICHIGAN

ROLLER BEARING CAGE AND METHOD OF FORMING THE SAME

Application filed August 5, 1929. Serial No. 383,743.

This invention relates to a roller bearing cage and method of forming the same, and has to do particularly with an inexpensive, easily assembled container unit for receiving and positioning cylindrical roller bearings.

Many different types of cages for roller bearings have been designed, and in the case of cylindrical roller bearings, it has been the practice to form spaced annular retaining means connected together by transverse connecting rods or pins, and means in the retaining means for receiving and positioning the cylindrical roller bearings spaced between said connecting pins.

It is the object of the present invention to provide a cage or container for roller bearings, particularly cylindrical roller bearings, which is formed solely from two integral annular ring members, thus completely eliminating all connecting and spacing means. More specifically, I have provided a permanent integral bearing container formed from two metal stampings permanently secured together in such a manner as to provide retaining pockets for the cylindrical roller bearings.

One of the main features of the present invention resides in the method of fabricating my novel container member, wherein each retained member going to make up the main container is stamped from flat stock and the two retainers are then complementally formed and secured together whereby to receive and permanently position the roller bearings. Still another feature resides in the novel manner of securing the retaining and positioning elements together whereby to form a solid integral cage.

Other features of the invention reside in the novel design of the cage itself, the manner of assembly, and the structure of that part of the cage which directly receives the bearing member.

In the drawings:

Fig. 1 is a sectional view taken through a bearing provided with the preferred form of my novel cage structure.

Fig. 2 is a longitudinal sectional view taken on line 2—2 of Fig. 1.

Fig. 3 is a front view of a complete cage member with the roller bearings positioned therein, and showing one manner of securing the retaining rings together.

Fig. 4 is a plan view of the stamped out blank made from a piece of flat stock and illustrating the first step of my invention.

Fig. 5 is a front elevation of the structure shown in Fig. 4, and showing the preferred manner of striking up the elements for directly receiving the bearing members.

Fig. 6 illustrates one method of assembling the cage member, wherein the roller bearings are positioned within the pocket formed in the outer container member.

Fig. 7 is a view illustrating one method of assembling the inner retainer member within the outer retainer member whereby to positively secure the roller bearings in place.

Figure 8:
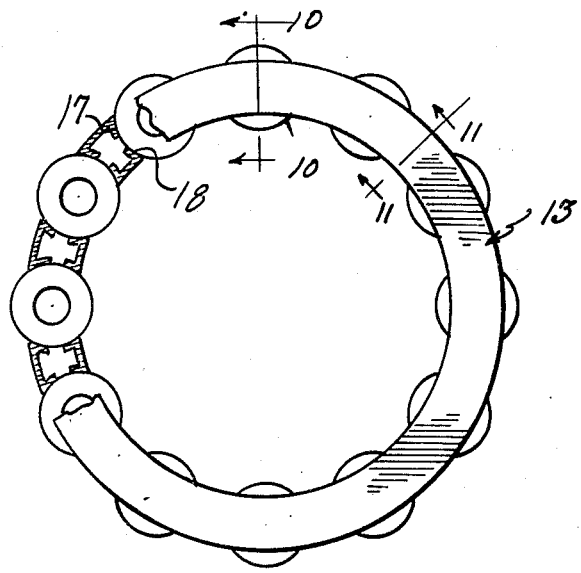
Fig. 8 is an end view partially in section of a slightly modified form of cage structure for receiving and positioning larger roller bearings in closer spaced proximity.
Figure 9:
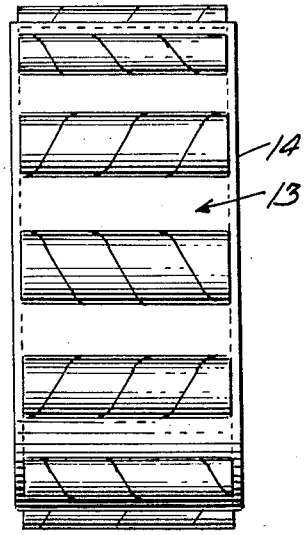
Fig. 9 is a front view of the bearing shown in Fig. 8.
Figure 10:
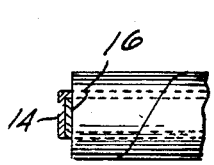
Fig. 10 is a fragmentary sectional view taken on line 10—10 of Fig. 8, illustrating the manner of securing the retaining members together.

While the present container or cage member is particularly adaptable for use with cylindrical roller bearings, and is so illustrated in the drawings, it will be understood that the same method may be used in connection with the fabrication of cages for use with bearings of different types, particularly on tapered roller bearings. In the forming of roller bearings of the smaller type wherein the rollers are spaced a considerable distance apart, as best shown in Fig. 1, I preferably fabricate the outer ring or retainer of the cage from a sheet of suitable flat stock 1, as best shown in Fig. 4. This strip of flat stock is preferably stamped in a single operation so as to form a plurality of spaced slots or openings 2. The first step in the operation is to stamp out or form a series of openings 2 with the arcuate shaped projections or side walls 3, the forming of these projections being possible in the initial stamping out step.

The first step just described is applicable to both the outer ring or retainer which may be designated 4 and the inner ring or retainer 5, the only difference being that in assembly the arcuate shaped projections will extend on opposite sides of the ring of the assembled cage. For the purpose of clarity, the projections on the outer retainer will be designated 3, while those on the inner retainer will be designated 6.

In my preferred method of assembly of this small type cage or container, the arcuate shape given the projections 3 and 6 is such that when the inner ring member 6 is given an annular shape, as shown in Fig. 1, the radius of such projection 6 is substantially equal to the radius of the cylindrical roller members 7. The radius of the projections 3 of the outer ring member may be initially substantially the same as the projections 6, but when such outer ring member 4 is given an annular shape, as shown in Fig. 1, it will be obvious that said projections 6 will spread apart and it is my intention, in the preferred form of assembly, that these outer projections shall be spread apart enough as to just receive a roller member 7.

In this method of assembly it will be obvious that the ring members 4 and 5 may be rolled up into annular shape and directly slipped together before receiving a single roller. Furthermore, these retaining ring members 4 and 5 may be also spot welded as at 8 and 9 and in addition may be preferably spot welded as at 10 in between each roller receiving pocket. This spot welding may be performed either before or after the roller assembly.

In assembling the rollers by this first method the roller members may be successively dropped into each pocket and the projections 3 subjected to a suitable stamping operation whereby to close in said projections around each roller bearing. This may be accomplished either manually or automatically. It will be obvious, of course, that it is possible to obtain a very efficient permanent cage member by merely spot welding at the ends 11 of the outer ring 4 and at the points 8 and 9, but I prefer to secure the two shells together by spot welding longitudinally of the shells and along the space provided between each roller receiving pocket. This provides a very strong and permanent cage or container assembly.

In Figs. 6 and 7 I have illustrated a second method of assembling my novel cage member wherein the projections 6 of the outer ring or shell 4 are given such an initial arcuate shape that when the shell member is formed as shown in Fig. 6, these projections 6 will be of a radius to nicely receive the roller members 7. In this case, the next step will be the forming of the inner shell or ring member 5 in a substantially involute shape as shown in Fig. 7, whereby the same may be easily assembled by gradually unfolding or expanding the ring. In this case, it will be obvious that both the outer projections 6 and the inner projections 3 will have an arcuate shape so as to nicely fit the roller bearings when moved to assembled position. Here, as before, the respective rings or shells may be welded together in several different ways. The first method will probably lend itself to quicker and easier assembly of the roller members but both methods will provide efficient and quick assembly, and in both methods there are only three essential steps; namely, stamping the flat stock, assembling, and securing by welding.

The cage or container thus provided is not only permanent, and not only positively locates the roller bearings, but it will be obvious that because of the large surface contact between the projections 3 and 6 and the roller bearings and the plain contact between the ends of the roller bearings and the end walls of the cut away pockets, that very little, if any, wear will take place, which is directly in contrast to this same type of bearing wherein pins are usually provided for receiving the roller bearings or the roller bearings provided with suitable small journals for fitting in apertures in the container rings.

While the bearing disclosed in Fig. 1 is readily adaptable to roller bearings of larger size by eliminating the spot welding between the roller bearings and just welding around the extreme ends of the shells, I prefer to construct the larger bearings in the manner disclosed in Figs. 8 to 13 wherein the two retaining rings or shells are formed in substantially the same manner as shown in Figs. 4 and 5. In other words, an outer ring member is formed by stamping out the ring member from a flat piece of sheet metal. The apertures or pockets for receiving the roller bearings may be formed substantially the same as shown in Figs. 4 and 5, but instead of having a narrow rim such as at 12 in Fig. 3, which extends in the direction of the axis, I prefer to turn in this rim to form flanges extending at right angles to the axis of the bearing. These flanges may be formed at the same time that the flat stock is stamped or punched out. In other words, I preferably form both the outer shell member and the inner shell member of the bearing shown in Fig. 8 by a single stamping operation from a flat piece of stock.

Figure 11:
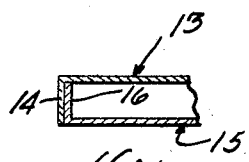
Fig. 11 is a sectional view taken on line 11—11 of Fig. 8 at a point intermediate the spaced roller bearings.
Figure 12:
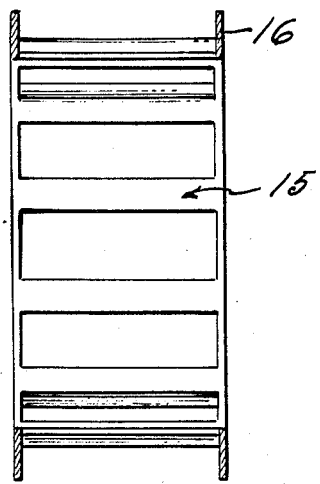
Fig. 12 is a longitudinal sectional view of the flanged inner retainer member.
Figure 13:
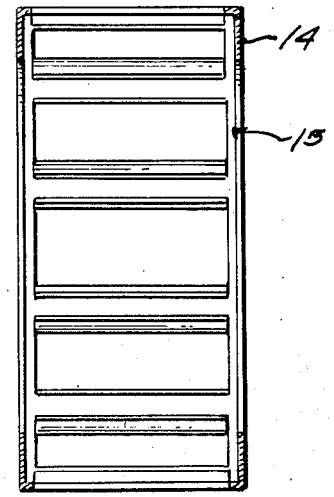
Fig. 13 is a similar view of the outer retainer member.

The outer shell member which may be designated 13, is preferably formed with an inturned flange 14 and the inner shell member 15 is preferably formed with an out turned flange 16, as best shown in Fig. 11. In Fig. 12 I have shown an inner shell or ring member completely formed and in Fig. 13 I have shown an outer shell member as completely formed. In assembling these two shell members they are preferably assembled wherein the inner shell member is preferably curled up and then unrolled and the two flanges welded. The roller bearings may then be inserted successively in the openings in the outer shell member, after which the metal around the openings in the outer shell may be stamped or formed to close in around the bearings. In other words, instead of welding the shells together, in the space between the roller members, they are welded together by welding the flanges at the ends of the roller members.

The flanged shell members or retaining members 13 and 15 may be stamped in various ways so as to provide pockets for the roller members. In Fig. 8 I have shown one method of turning in the stamped out portions so as to form the arcuate sides 17 and 18. The two shell members 13 and 15 may be also provided with arcuate projections exactly as shown in Fig. 1, or the portions forming the pockets may be stamped out so as to provide plain sharp angled pockets. Regardless of the bearing surface formed by the pockets it will be obvious that this method of forming integral bearings is well adapted for bearings of the larger types wherein it is practically impossible to provide a welded joint between the roller members.

It will thus be seen that I have provided a novel cage or container which is of very simple and inexpensive construction but which provides a very compact strong and permanent structure, the structure in each case being such that each part of the cage may be formed by a single stamping operation from a flat piece of stock, thus eliminating all complicated dies and fabricating steps.

What I claim is:

1. A container for cylindrical roller bearings, comprising a pair of annular sheet metal members integrally secured together, each member having complementally formed stamped out portions forming pockets for receiving the cylindrical roller bearings, said pockets completely surrounding the sides and ends of each roller bearing, and said members having cooperating flanges and being secured together solely by welding said flanges.

2. A container for cylindrical roller bearings, comprising a pair of annular sheet metal members integrally secured together, each member having complementally formed stamped out portions forming pockets for receiving the cylindrical roller bearings, said pockets completely surrounding the sides and ends of each roller bearing, and said members being secured together by welding between the spaced pockets.

3. A permanent container unit for roller bearings, comprising cylindrical spaced annular members, apertures in said annular members cooperating to form preformed pockets for the roller bearings, said members being integrally and directly secured together by welding to position the roller members in said pockets.

4. A permanent container for roller bearings, comprising a pair of concentrically positioned retaining shells integrally secured together by welding, each shell being provided with spaced, oppositely positioned, and complementally formed stamped out portions for forming closed preshaped pockets for the roller bearings.

5. A permanent container for roller bearings, comprising a pair of concentrically positioned retaining shells, each shell being provided with spaced, oppositely positioned, and complementally formed stamped out portions for forming closed preshaped pockets for the roller bearings, said members being integrally secured together by welding to permanently position the roller bearings within said closed pockets.

6. A permanent container for roller bearings, comprising a pair of concentrically adjacently positioned retaining shells, each shell being provided with spaced, oppositely positioned, and complementally formed stamped out portions for forming closed pockets for the roller bearings, said stamped out portions being arcuate in cross-section corresponding to the contour of the roller bearings, said members being provided with complementally positioned flanges welded together to permanently position the roller bearings within said pockets.

7. A permanent container for cylindrical roller bearings, comprising a pair of cylindrical sheet metal stampings adjacently positioned each provided with circumferentially spaced and complementally shaped, preformed, stamped out portions, said stamped out portions being arcuate in cross-section corresponding to the contour of the roller bearings, said members being integrally secured together to position the roller bearings in the pockets formed by the complemental arcuate stamped out portions.

8. An integral container unit for roller bearings, comprising two concentrically adjacently positioned annular members and complementally formed stamped out portions in each member for forming preshaped pockets for the roller bearings, said stamped out portions being arcuate in cross section corresponding to the contour of the roller bearings.

9. The method of forming containers for roller bearings, which comprises stamping out two pieces of flat metal stock, forming spaced apertures in each member, forming each strip into an annular shell, and spacing the respective apertures in each shell to form preformed pockets for receiving the roller bearings, and then inserting the roller bearings and welding the two shells together.

10. The method of forming containers for roller bearings, which comprises stamping out a plurality of complementally preformed spaced aperture walls in a pair of flat strips of stock, forming one strip into an annulus whereby the complementally formed parts in said strip extend inwardly, and forming another strip into an annulus whereby the complementally formed parts of said strip extend outwardly, collapsing one of said strips to assemble same inside the other annular strip in which the bearings are assembled and welding said strips together to form an annular container unit.

11. The method of forming containers for roller bearings, which comprises stamping out a plurality of complementally formed spaced apertures in a pair of flat strips of stock, forming one strip into an annulus whereby the complementally formed parts in said strip extend inwardly, and forming another strip into an annulus whereby the complementally formed parts of said strip extend outwardly, positioning said strips together by first collapsing one annulus inside the other whereby said complementally formed portions register to form circumferentially spaced pockets for the roller bearings, and welding said strips together to form an annular container unit.

12. The method of forming a container for roller bearings which comprises forming two annular sheet metal retaining shells with oppositely projecting but complementally formed portions for forming a series of pockets, welding the two shells together, placing the roller bearings in said pockets and then locking the roller bearings in position by distorting only one set of said complementally formed portions.

In testimony whereof I affix my signature.

EDWARD W. MITCHEL.